April 23, 1968 J. T. CLARK ET AL 3,378,911
WINDSHIELD WIPER ARM TOOLS
Filed June 13, 1966

INVENTORS
JAMES T. CLARK
JAMES E. WILSON
BY
*Galbreath*
ATTORNEY

United States Patent Office 3,378,911
Patented Apr. 23, 1968

3,378,911
WINDSHIELD WIPER ARM TOOLS
James T. Clark and James E. Wilson, Fort Morgan, Colo., assignors to Clark-Feather Mfg. Co., Fort Morgan, Colo.
Filed June 13, 1966, Ser. No. 557,268
4 Claims. (Cl. 29—267)

ABSTRACT OF THE DISCLOSURE

A handle terminating in a relatively short prying arm extending forwardly therefrom at an obtuse angle therewith and having a hooked tension plate hingedly suspended from the forward extremity of said prying arm, the rear extremity of the latter forming a fulcrum for prying said tension plate upwardly to form a plier-like grip upon the elbow fitting when the handle and a windshield wiper arm are gripped in the hand.

---

This invention relates to a tool for removing and replacing windshield wiper arms on automotive vehicles. A conventional automotive windshield wiper consists of a wiping element tiltably mounted on the outer extremity of a swinging wiper arm. The inner or axial extremity of the wiper arm is mounted on a spring-loaded pivot carried by an elbow fitting which is press-fitted over a knurled or splined actuating shaft projecting from the car body adjacent the windshield. The elbow fitting must be accurately fitted circumferentially on the splines of the actuating shaft so that the arc of swing of the wiper element conforms to the area limitations of the particular windshield. When once fitted, the wiper arms usually remain in place for the life of the car. However, it is often necessary to remove and replace the wipers in cases of accident or refinishing of the car.

The removal and replacement is an exceedingly difficult task due: to the limited space between the wiper arms and the car body; to the fact that the protruding actuating shaft cannot be reached and gripped with conventional tools; and to the fact that the wiper arm is flexible relative to its point of attachment.

The principal object of this invention is to provide a simple, economical and easily used tool which will cooperate with the wiper arm to provide a plier-like grip on the elbow fitting of a windshield wiper so that the latter can be easily rocked loose and lifted from the protruding extremity of the actuating shaft for removal, replacement or adjustment purposes.

A further object is to provide a tool of this type which will not damage or mar either the car finish or the wiper assembly and which can be fitted to various types of fittings.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

Figure 1:
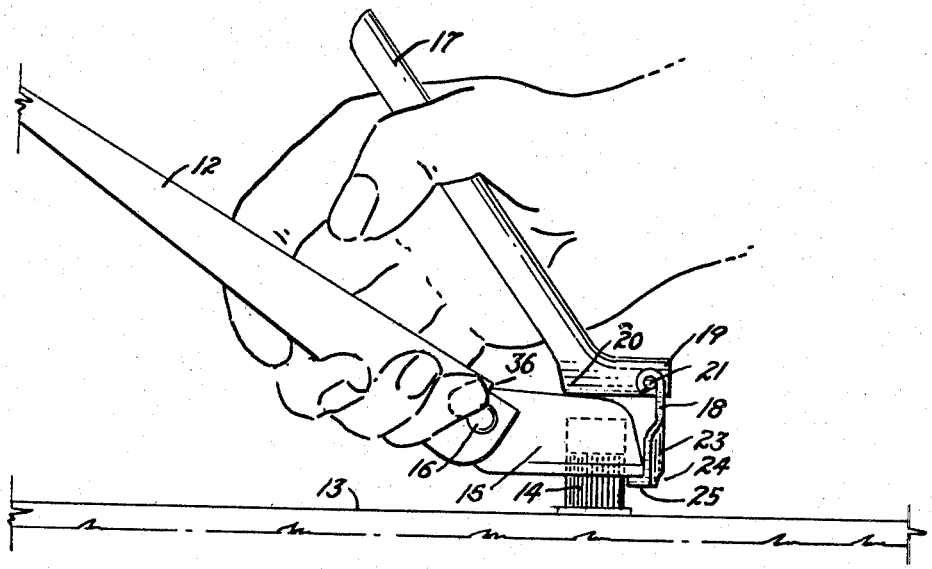
FIG. 1 is a side elevational view of the windshield wiper arm tool of this invention as it would appear when in use, with the wiper arm partially removed.
Figure 2:
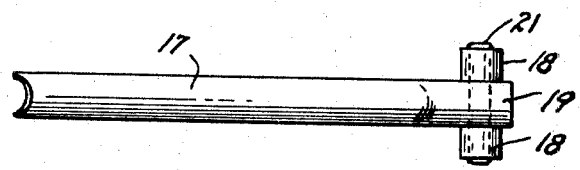
FIG. 2 is a slightly enlarged, front, elevational view of the tool.

Conventional elements are designated in FIG. 1 by the following reference characters: windshield wiper arm 12; car body or windshield frame 13; splined extremity of actuating shaft 14; elbow fitting 15; and spring-loaded pivot rivet 16, joining the wiper arm 12 to the fitting 15 and resiliently urging the arm toward the windshield. An outward-movement-limiting stop, such as indicated at 36, is conventionally provided to limit the degree the arm 12 may be pivotally swung outward from the windshield.

The tool of this invention is exceedingly simple and consists of a handle 17 with a hooked tension plate 18 depending therefrom.

Figure 4:
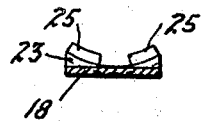
FIG. 4 is a horizontal cross section taken on the line 4—4, FIG. 3.
Figure 3:
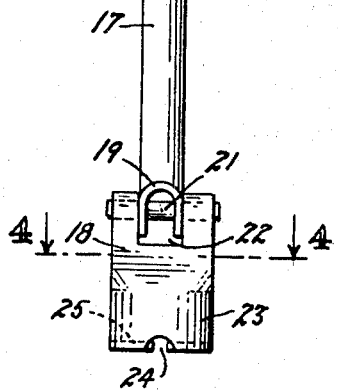
FIG. 3 is a top plan view thereof.

The handle 17 is preferably, though not necessarily, stamped from a metal plate to form an inverted U-shaped cross-section having a rounded upper surface and two parallel sides as shown in FIG. 4. The handle terminates at its lower extremity in a prying arm 19 which extends forwardly from the handle at an angle of approximately 135° therewith. The lower surfaces of the sides of the U forming the arm 19 are extended rearwardly to form a rearwardly-protruding fulcrum boss 20. A straight, rotatable, pivot rivet 21 passes transversely through and projects from the two sides of the arm 19 adjacent the forward extremity of the latter from which the tension plate 18 is suspended so that it may freely swing in the plane of the handle.

The tension plate 18 comprises a substantially rectangular metal stamping having a medial notch 22 in its upper edge to receive the arm 19, the plate at each side of the notch 22 is rolled around the projecting extremities of the pivot rivet 21 as shown in FIG. 1. The upper portion of the tension plate 18 is flat and parallel to the plane of the pivot rivet 21. The lower portion of the tension plate 18, indicated at 23, is semi-cylindrical and the lower edge of the lower portion 23 is medially notched, as indicated at 24, and turned axially inward to form two separated ledge flanges 25.

The method of use is illustrated in FIG. 1. Briefly, to remove the elbow fitting, the ledge flanges 25 are inserted between the elbow fitting 15 and the windshield frame 13 and the handle 19 is swung, in the palm of the hand, over the elbow fitting with the fulcrum boss 20 resting thereon. The fingers are then clasped about the wiper arm 12 and the latter is drawn away from the windshield against the bias of the spring-loaded pivot rivet 16, until outward movement is stopped by the conventional movement-limiting stop 36. Contraction of the hand now exerts a plier-like effect on the handle 17 and the wiper arm 12 so that the elbow fitting 15 is rigidly gripped between the ledge flanges 25 and the fulcrum boss 20. The fitting 15 and the entire assembly can now be urged outwardly and simultaneously tilted back and forth on the splined extremity 14 of the actuating shaft to cause it to work outwardly thereon. In FIG. 1, the fitting 15 is shown worked outwardly for approximately ½ the length of the splined extremity 14. To replace the wiper arm, the tool is applied as in FIG. 1 and the fitting 15 is fitted over the actuating shaft at the proper radial position and urged inwardly with lateral tilting movements until it reaches its initial position fully covering the splined extremity of the actuating shaft.

The arcuate semi-cylindrical portion 23 allows the tension plate 18 to be closely fitted to the fitting 15 and the spaced arcuate positions of the ledge flanges 25 allow the flanges to be closely fitted against the splined extremity 14 of the actuating shaft so that a firm grip is provided in the limited space usually available.

Since the tension plate swings freely from the pivot rivet 21, it will automatically accommodate elbow fittings of various types and sizes. The pivotal mounting also prevents the ledge flanges 25 from being pried off the fitting as the handle is urged rearwardly as they would be if the prying arm 20 and the tension plate 18 were rigidly connected.

While a specific form of the invention has been described and illustrated herein, it is to be understood that the same may be varied within the scope of the appended claims, without departing from the spirit of the invention.

Having thus described the invention what is claimed and desired to be secured by Letters Patent is:

1. A tool for use in conjunction with the wiper arm of an automotive windshield wiper for gripping the elbow fitting of the wiper arm to facilitate the removal of the fitting from the splined extremity of an actuating shaft comprising:
   (a) a relatively short straight prying arm adapted to rest at its rear extremity against said elbow fitting over the position of said splined extremity with its forward extremity projecting radially beyond said fitting in the plane of said wiper arm;
   (b) a tension plate pivotally attached at its one extremity to the forward extremity of said prying arm and provided at its other extremity with a ledge flange, said plate being positioned to lie against said elbow fitting in the plane of said wiper arm with the ledge flange hooked beneath said fitting; and
   (c) a handle affixed to the rear extremity of said prying arm at an obtuse angle to the latter and adapted to extend away from said elbow fitting and toward said wiper arm so that said handle and said wiper arm can be gripped by the thumb and fingers of a single hand to urge said fitting against the rear extremity of said prying arm and against said ledge flange to provide a firm grip on said elbow fitting to enable the latter to be manually lifted from said splined extremity and conveniently supported in the said single hand.

2. A tool as described in claim 1 having a fulcrum boss on the rear of said prying arm so positioned that it will exert downward pressure on said fitting as said handle is swung rearwardly.

3. A tool as described in claim 2 in which the upper portion of said tension plate is flat and lies in a plane parallel to the plane of said pivot element and in which the lower portion of said tension plate is semi-cylindrical so as to partially surround said fitting when said ledge flange is positioned below said fitting, said ledge flange being formed on the lower edge of said semi-cylindrical portion.

4. A tool as described in claim 3 having a medially positioned bottom notch in the lower edge of said cylindrical portion dividing said ledge flange into similar, separated parts.

References Cited
UNITED STATES PATENTS

| | | | |
|---|---|---|---|
| 1,434,437 | 11/1922 | Hodgkins | 29—267 |
| 2,457,258 | 12/1948 | Mitchell | 254—21 |
| 2,540,388 | 2/1951 | Dreeben | 29—267 |
| 3,315,341 | 4/1967 | Lara | 29—278 |

MYRON C. KRUSE, *Primary Examiner.*